T. A. PHILPOTT.
TIRE TUBE.
APPLICATION FILED JAN. 6, 1919.

1,371,807.

Patented Mar. 15, 1921.

WITNESSES
J H Crawford

INVENTOR.
T. A. Philpott,
BY
Victor J. Evans
ATTORNEY.

UNITED STATES PATENT OFFICE.

TYRA A. PHILPOTT, OF COLUMBUS, MONTANA.

TIRE-TUBE.

1,371,807.

Specification of Letters Patent.    Patented Mar. 15, 1921.

Application filed January 6, 1919. Serial No. 269,933.

*To all whom it may concern:*

Be it known that I, TYRA A. PHILPOTT, a citizen of the United States, residing at Columbus, in the county of Stillwater and State of Montana, have invented new and useful Improvements in Tire-Tubes, of which the following is a specification.

This invention relates to a novel construction of spring tube for vehicle tires and the principal object of the invention is to provide a tube of this nature made of a plurality of spring metal loops for taking the place of the usual rubber inner tube.

Another object of the invention is to provide means for removably holding each loop in place within the tire so that if one loop should break it may be removed and replaced by another one.

The invention also consists in certain other features of construction and in the combination and arrangement of the several parts, to be hereinafter fully described and illustrated in the accompanying drawings and specifically pointed out in the appended claim.

In describing my invention in detail, reference will be had to the accompanying drawings wherein like characters denote like or corresponding parts throughout the several views, and in which.

Figure 1:
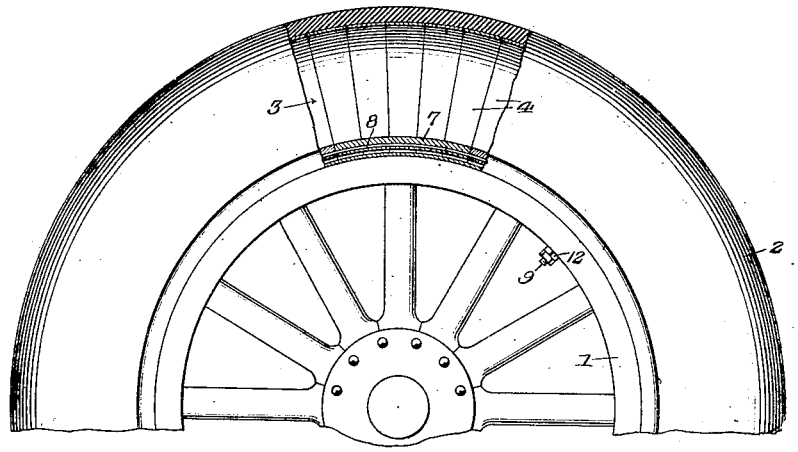
Figure 1 is a side view of a part of a wheel embodying my invention, parts being shown in sections.
Figure 2:
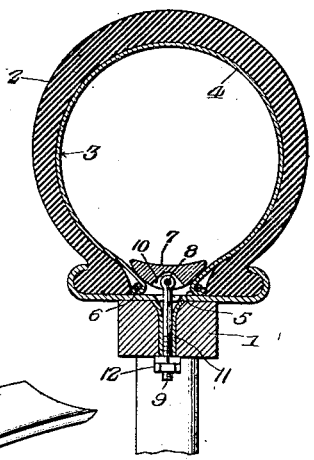
Fig. 2 is a cross section through the tire and a portion of the wheel.
Figure 4:
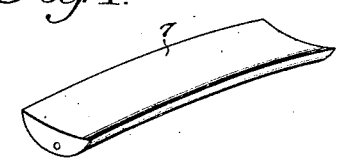
Fig. 4 is a view of one of the blocks.
Figure 3:
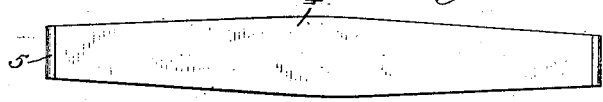
Fig. 3 is a view of one of the loops.

In these views, 1 indicates the felly of the wheel, 2 the tire and 3 the inner tube, which is constructed according to my invention. As shown, this tube is made up of a plurality of spring metal loops 4, arranged circumferentially around the wheel and having their ends held between the beads of the tire. Each loop is made with its central part of greater width than the ends and the edges taper off toward said ends. The ends of the loops are rolled up to provide the eyes 5. These eyes engage the wires 6 which support the loops within the tire.

The wires 6 are arranged in spaced parallelism and extend circumferentially about the contiguous rim portion of the tire wheel.

The loops are held in firm contact with the inner surface of the tire by means of the arc shaped blocks 7, said blocks being of concavo-convex shape in cross section. These blocks are strung on the wire 8 which passes longitudinally through the centers thereof. The blocks are placed within the loops and engage with the ends of said loops to press the same outwardly into engagement with the beads of the tire. The means for drawing the blocks into clamping position consists of a split eye bolt 9 having its head engaging a recess 10 formed in the lower face of one of the blocks, said bolt being looped over the wire 8 which is exposed by said recess. The bolt passes through an opening in the rim of the wheel and through a sleeve 11 placed on said rim, and is adapted to receive a nut 12. In this way when the nut 12 is tightened the eye bolt 9 will be moved so as to take up the slack in the wire 8 and thus reduce the diameter of the circle formed by the blocks 7. This will bring the blocks into clamping position within the loops, so as to force the beads of the tire into the grooves of the rim. When necessary a number of bolts similar to that shown at 9 may be used to take up the slack in the wire.

It will be seen that the parts are all connected together by the wires so that the tube may be easily handled and placed within the tire. If any of the spring loops should break it is a simple matter to remove a broken loop and replace it by a new one.

It is thought from the foregoing description that the advantages and novel features of my invention will be readily apparent.

I desire it to be understood that I may make such changes in the construction and in the combination and arrangement of the several parts, provided that such changes fall within the scope of the appended claim.

Having described the invention, what is claimed is:

The combination with a wheel having a felly and a tread element mounted thereon, of a sustaining member arranged within said tread element, a plurality of arcuate blocks arranged in annular formation within said tread element and engaging said sustaining member, a flexible element extending longitudinally through said blocks for connecting the same, one of said blocks being formed with a recess surrounding said flexible element, a sleeve extending through said felly, an eyebolt extending through said sleeve and having a head receiving said flexible element, and a nut threaded on said bolt for tensioning said flexible element.

In testimony whereof I affix my signature.

TYRA A. PHILPOTT.